United States Patent
Amin et al.

(10) Patent No.: US 7,472,328 B1
(45) Date of Patent: Dec. 30, 2008

(54) AUTOMATIC TESTING OF MICROPROCESSOR BUS INTEGRITY

(75) Inventors: Hitesh Amin, Petaluma, CA (US); Philip Edward Foster, Santa Rosa, CA (US); Marc Alan Bennett, Petaluma, CA (US); Steven Harold Goody, Santa Rosa, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 11/437,370

(22) Filed: May 19, 2006

Related U.S. Application Data

(63) Continuation of application No. 10/166,207, filed on Jun. 10, 2002, now Pat. No. 7,076,711.

(51) Int. Cl.
*G06F 11/00* (2006.01)
(52) U.S. Cl. ..................................... 714/738
(58) Field of Classification Search .................. 714/738, 714/724, 718, 719, 56, 789, 733, 736, 30, 714/28, 43
See application file for complete search history.

(56) References Cited

U.S. PATENT DOCUMENTS

| | | | |
|---|---|---|---|
| 4,622,669 A | 11/1986 | Pri-Tal | |
| 4,710,927 A | 12/1987 | Miller | |
| 4,868,822 A | 9/1989 | Scott et al. | |
| 5,029,274 A | 7/1991 | Goff et al. | |
| 5,210,864 A | 5/1993 | Yoshida | |
| 5,525,971 A * | 6/1996 | Flynn | 714/724 |
| 5,815,493 A | 9/1998 | Riley | |
| 5,905,738 A | 5/1999 | Whetsel | |
| 5,951,705 A | 9/1999 | Arkin et al. | |
| 5,978,934 A * | 11/1999 | Gates | 714/41 |
| 6,049,894 A * | 4/2000 | Gates | 714/41 |
| 6,292,911 B1 | 9/2001 | Swanson | |
| 6,543,027 B1 * | 4/2003 | Hughes et al. | 714/799 |
| 6,545,454 B1 | 4/2003 | Wagstaff | |
| 6,546,507 B1 * | 4/2003 | Coyle et al. | 714/43 |
| 6,609,221 B1 | 8/2003 | Coyle et al. | |
| 6,757,854 B1 | 6/2004 | Zhao et al. | |

* cited by examiner

*Primary Examiner*—M. Mujtaba K Chaudry
*Assistant Examiner*—Fritz Alphonse
(74) *Attorney, Agent, or Firm*—Cindy Kaplan

(57) ABSTRACT

Integrated circuit bus integrity may be verified without specialized test equipment. In a diagnostic mode, the integrated circuit may output a series of predetermined activation patterns onto the data bus to verify integrity of the data bus. Further bus verification may be provided by an address capture mode where address bus contents are reflected onto the data bus. A microprocessor may control diagnostic mode operation.

20 Claims, 5 Drawing Sheets

AUTOMATIC TESTING OF MICROPROCESSOR BUS INTEGRITY

RELATED APPLICATION

This patent application is a continuation of U.S. patent application Ser. No. 10/166,207, filed Jun. 10, 2002, issued as U.S. Pat. No. 7,076,711, which is incorporated herein by reference in its entirety.

BACKGROUND OF THE INVENTION

The present invention relates generally to testing and, in one embodiment, more particularly to integrated circuit testing.

It is desirable to check the integrity of the bus interfaces of an integrated circuit to verify that there are no open circuits, short circuits, or other failures that would impede bus communication with the integrated circuit. It is desirable to perform this verification function both in the manufacturing environment and in the field. This verification should discover open or shorted board traces as well as damage to pins of the integrated circuit.

Boundary scan testing is the industry standard for integrated circuit verification and can readily accommodate bus integrity verification along with testing of internal circuitry of the integrated circuit. Boundary scanning, however, requires highly expensive and specialized equipment that interfaces with scanning functionality built into the integrated circuit. Thus, it is infeasible to verify bus integrity in this way once the integrated circuit has left the manufacturing environment.

What is needed are systems and methods for verifying bus integrity of an integrated circuit that reduce the need for specialized test equipment.

SUMMARY OF THE INVENTION

By virtue of one embodiment of the present invention, integrated circuit bus integrity may be verified without specialized test equipment. In a diagnostic mode, the integrated circuit may output a series of predetermined activation patterns onto the data bus to verify integrity of the data bus. Further bus verification may be provided by an address capture mode where address bus contents are reflected onto the data bus. A microprocessor may control diagnostic mode operation.

A first aspect of the present invention provides a method for testing an integrated circuit. The method includes: activating a diagnostic mode on the integrated circuit, performing successive memory access operations on the integrated circuit, and in synchronization with the successive read operations, monitoring lines of a first bus connected to the integrated circuit for a sequence of activation patterns to verify operation of the integrated circuit.

A second aspect of the present invention provides a method for testing an integrated circuit. The method includes: activating a diagnostic mode on the integrated circuit, performing successive memory access operations wherein a sequence of activation patterns is applied to a first bus connected to the integrated circuit, and in synchronization with the sequence of activation patterns, monitoring lines of a second bus connected to the integrated circuit to verify operation of the integrated circuit.

A third aspect of the present invention provides an integrated circuit coupled to a data bus. The integrated circuit includes: a diagnostic mode logic block, a non-diagnostic mode block, a multiplexer system that selects signals from one of the diagnostic mode logic block and the non-diagnostic mode logic block to forward to the data bus, and wherein upon entering a diagnostic mode, the multiplexer system couples the data bus to the diagnostic mode logic block and the diagnostic mode logic block responds to a sequence of read operations directed to the integrated circuit by outputting a sequence of predetermined patterns on the data bus.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative environment where address and data buses interconnect an integrated circuit and a microprocessor. They may be mounted on a printed circuit board that performs digital processing functions under control of the microprocessor. For example, the board may serve as, e.g., a network interface, a computer peripheral, a computer motherboard, etc.

Figure 1:
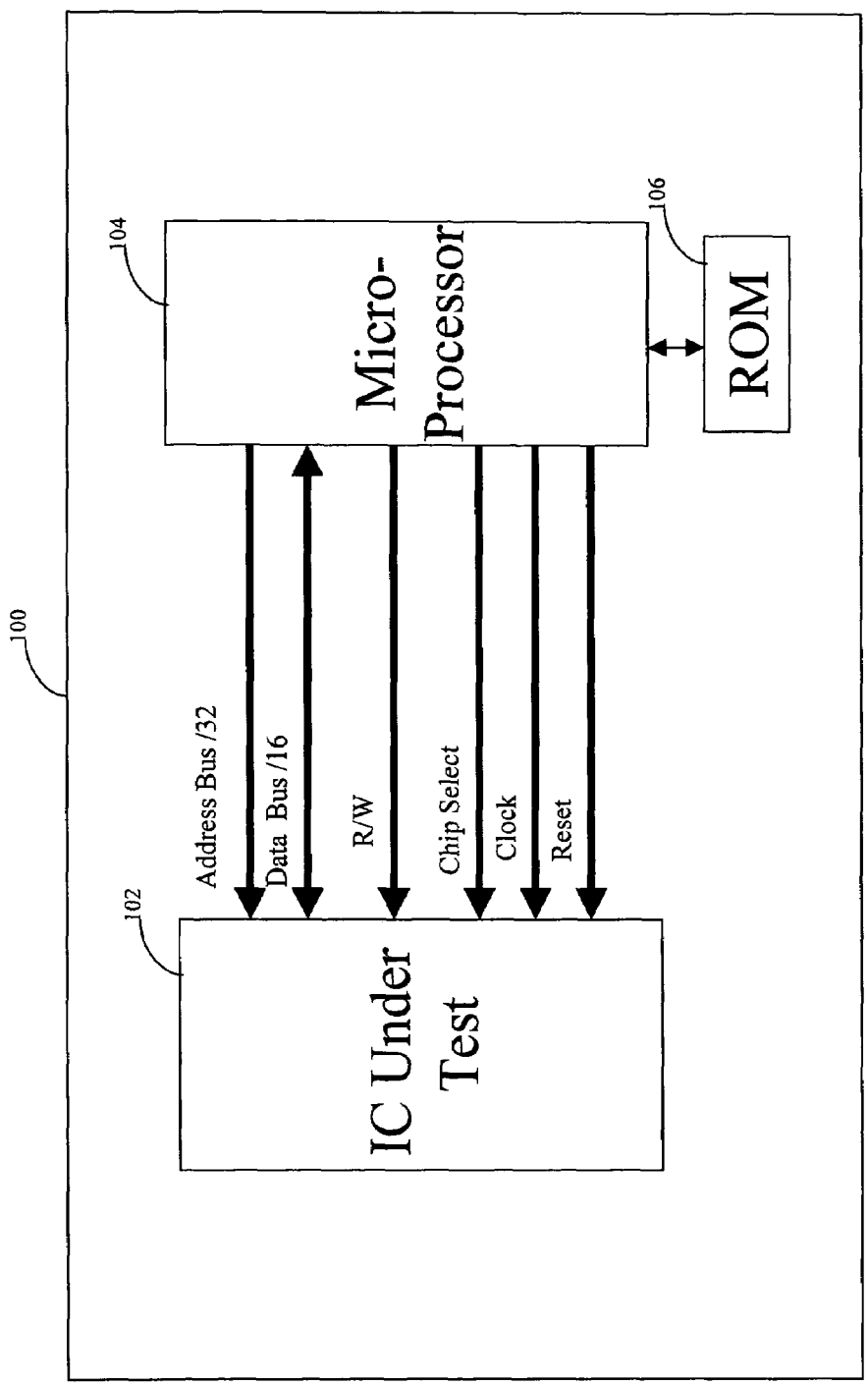
FIG. 1 depicts a microprocessor and an integrated circuit to be tested according to one embodiment of the present invention.

FIG. 1 depicts such an arrangement according to one embodiment of the present invention. A printed circuit board 100 has mounted thereon an integrated circuit 102 and a microprocessor 104. Alternatively, integrated circuit 102 and microprocessor 104 are mounted on separate boards, or in some other way. It is of course appreciated that integrated circuit 102 and microprocessor 104 will typically interoperate with numerous other components to perform the desired function(s).

Integrated circuit 102 may be, e.g., an FPGA, an ASIC, a fully custom logic chip, etc. Integrated circuit 102 connects to microprocessor 104 via one or more buses including, e.g., an address bus and a data bus. In the depicted example, the address bus is 32 bits wide and the data bus is 16 bits wide, although of course these bus widths are merely representative. Furthermore, microprocessor 104 generates a chip select signal to indicate a bus access to integrated circuit 102. A R/W signal indicates whether the bus access is for the purpose of reading data or writing data. A clock provides timing for bus operations. Microprocessor 104 may exploit a reset signal to force integrated circuit 102 into a special diagnostic mode as will be explained below. There may, of course, be numerous other connections to integrated circuit 102 suitable for implanting the assigned tasks.

One skilled in the art will appreciate that bus accesses to integrated circuit 102 will often actually occur through a bus controller, I/O controller, memory controller, or other similar component. Here for clarity of depiction and to avoid discussion of circuitry not crucial to an understanding of the present invention, FIG. 1 omits such components. Instead, such components are understood as part of microprocessor 104 even if they are physically separate.

In one embodiment, memory-mapped I/O is used for access to integrated circuit 102. The system designer has allocated a range of addresses in the address space of microprocessor 104. When a program of microprocessor reads from or writes to an address in this range, the chip select signal activates to indicate a request to access integrated circuit 102.

Microprocessor 104 may be any suitable microprocessor or microcontroller. Microprocessor 104 executes instructions stored in a read-only memory (ROM) 106. The instructions stored on ROM 106 may operate both the diagnostic mode of the present invention and the non-diagnostic mode that implements normal system functionality. ROM 106 is only one example of a computer-readable storage medium that can store software codes for implementing embodiments of the present invention and any suitable storage medium may substitute. Also, prior to storage on ROM 106, these instructions may be stored on a floppy disk, CD-ROM, a signal traveling across the Internet, etc. All of these are representative storage media.

Figure 2:
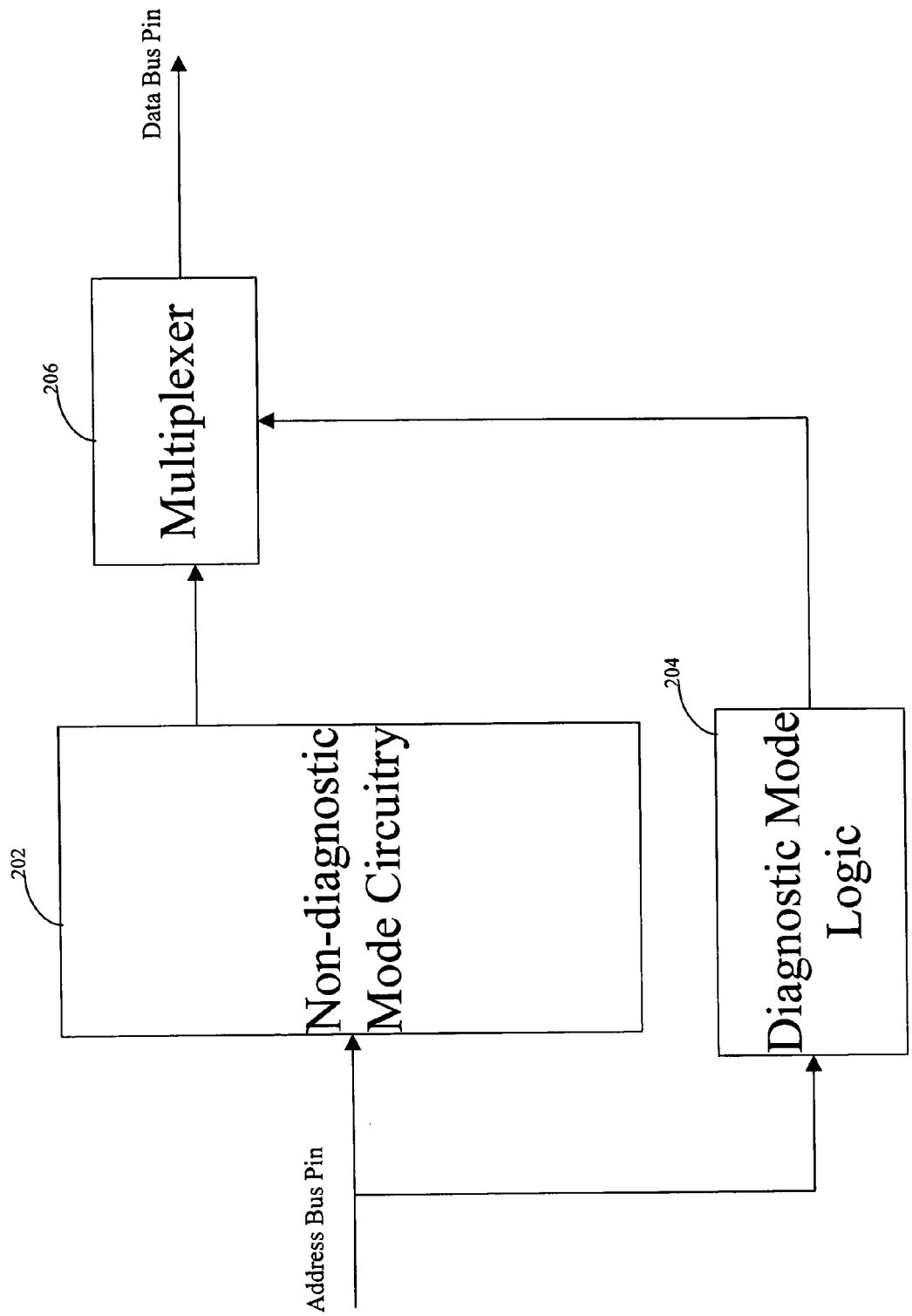
FIG. 2 depicts details of the integrated circuit of FIG. 1 according to one embodiment of the present invention.

FIG. 2 depicts internal details of integrated circuit 102 according to one embodiment of the present invention. The functional circuitry of integrated circuit 102 is divided into non-diagnostic mode logic 202 and diagnostic mode logic 204. The non-diagnostic mode logic performs the non-diagnostic mode functions specified for integrated circuit 102 and incorporates logic gates, memory cells, etc. as appropriate. The diagnostic mode logic performs diagnostic functions according to embodiments of the present invention by, e.g., monitoring and generating bus signals as described herein.

FIG. 2 also shows connections to a representative external data bus pin and a representative external address bus pin. Both the diagnostic mode logic 202 and the non-diagnostic mode logic 204 monitor the address bus pin input. Output to the data bus pin may originate with either logic block. A multiplexer 206 selects between diagnostic mode logic 202 and non-diagnostic mode logic 204. A similar structure is preferably duplicated for each address bus pin and each data bus pin.

Figure 3:
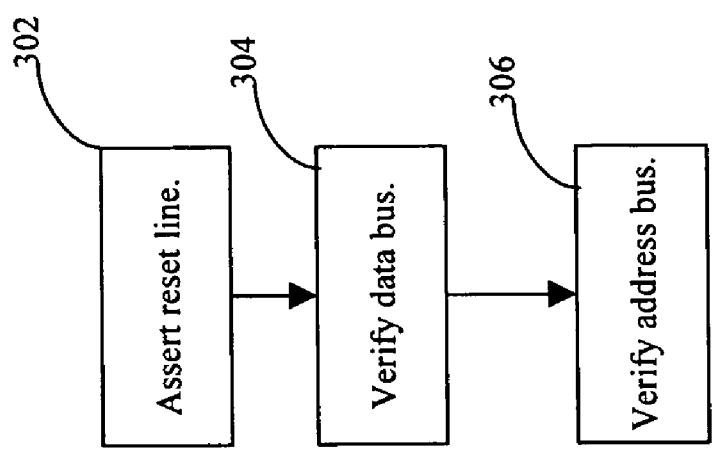
FIG. 3 is a flowchart describing steps of verifying bus integrity according to one embodiment of the present invention.

FIG. 3 is a top-level flowchart describing steps of verifying bus integrity according to one embodiment of the present invention. At step 302, microprocessor 104 asserts the reset line (or e.g., a dedicated "diagnostic mode pin") of integrated circuit 102 to invoke a diagnostic mode. Alternatively, microprocessor 104 accesses (e.g., reads or writes) a predetermined register on integrated circuit 102 to invoke the diagnostic mode. Step 302 may occur automatically upon power-up or reset of microprocessor 104, or it may occur as a result of user action at a keyboard or other user interface coupled to microprocessor 104. The reset line of microprocessor 104 may be mapped as a particular address so that reset line assertion is implemented as a bus operation at the allocated address.

At step 304, microprocessor 104 performs bus operations to test the integrity of the data bus connections to integrated circuit 102. The discussion in reference to FIG. 4 will provide greater detail of step 304. At step 306, microprocessor 104 performs bus operations to test the integrity of the address bus connections to integrated circuit 102. The discussion in reference to FIG. 5 will provide greater detail of step 306.

Figure 4:
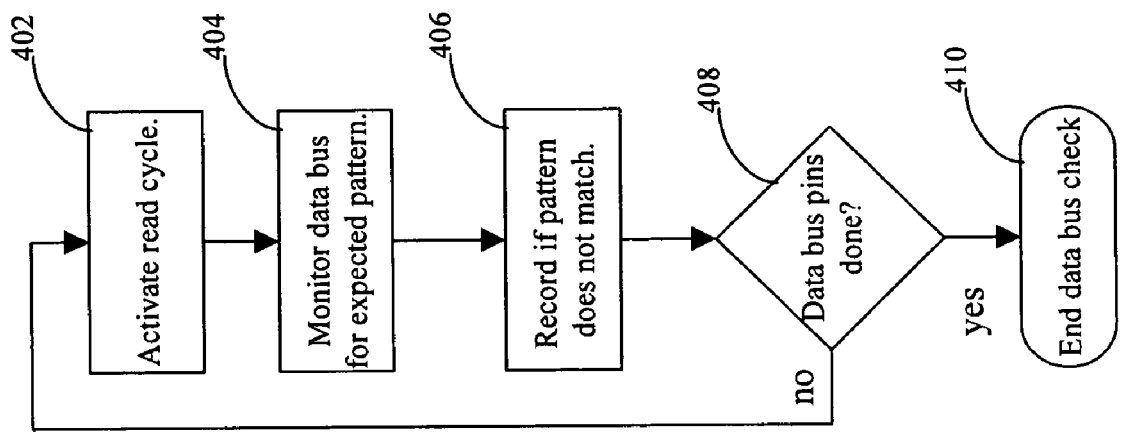
FIG. 4 is a flowchart describing steps of verifying data bus integrity according to one embodiment of the present invention.

FIG. 4 is a flowchart describing steps of testing data bus integrity according to one embodiment of the present invention. Overall, after invoking the diagnostic mode, microprocessor 104 performs a series of read operations within the address space allocated to integrated circuit 102. As a result of being in the diagnostic mode, integrated circuit 102 responds to these read operations by walking a "1" bit across the data bus. Microprocessor 104 reads the data bus for the expected values to verify the data bus integrity.

In detail, at step 402, after invoking the diagnostic mode, microprocessor 104 performs a read operation on an address within the address range allocated to integrated circuit 102. Due to the invocation of the diagnostic mode, each instance of multiplexer 206 selects the output of diagnostic mode logic 204 for output to the data bus. Diagnostic mode logic will select an activation pattern to the data bus depending on how many iterations of step 402 have already occurred. In one embodiment, the first value output to the data bus will be 1000000000000000, the second value output will be 0100000000000000, and so on so that a "1" bit is walked across the data bus allowing verification of each bit. Any appropriate sequence of activation patterns may be used within the scope of the present invention.

At step 404, microprocessor 104 tests the value that it retrieves from the data bus for the activation pattern expected for that particular iteration. Any failure to match indicates a fault and is recorded and externally indicated to the user through, e.g., a warning message on a monitor, a fault light, etc., at step 406. A failure to match may be due to a short, open, or other fault on any data bus pin or trace. A step 408 tests whether all of the data pins have been tested. If they have, the data bus test completes at step 410. If they have not, the next iteration begins at step 402. In the depicted embodiment where there are 16 data bus pins, there are 16 iterations of the steps of FIG. 4.

After the data bus testing is completed, the diagnostic mode logic 204 enters an address capture mode where read operations to integrated circuit 102 result in reflection of address bus contents onto the data bus. To test the address bus pins, microprocessor 104 may use a sequence of test patterns much like the ones output by integrated circuit 102 to test data bus integrity.

Figure 5:
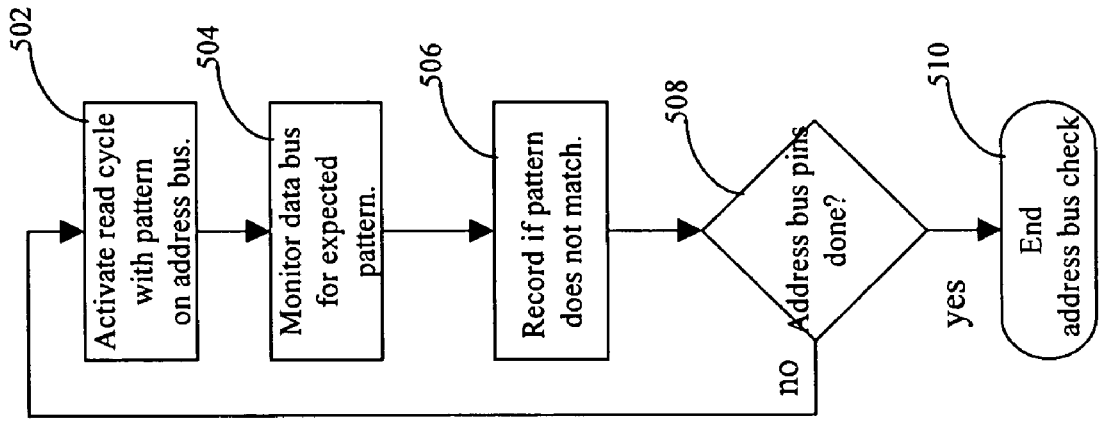
FIG. 5 is a flowchart describing steps of verifying address bus integrity according to one embodiment of the present invention.

FIG. 5 is a flowchart describing detailed steps of address bus integrity verification operation according to one embodiment of the present invention. At step 502, microprocessor 104 performs a read operation specifying an address in accordance with a particular activation pattern. The activation pattern will depend on the current iteration of step 502. In one embodiment, in each pattern exactly 1 address bit is asserted with the asserted bit being shifted across the bus for successive patterns. In one embodiment, only the address bits used to access registers on the chip are tested.

Integrated circuit 102 will reflect the address bus contents onto the data bus. If the address bus is narrower than the data bus or the same width, this is a straightforward copying of the address bus value to the data bus. If the address bus pins are wider than the data bus, multiple read operations are used to reflect successive segments of the address bus onto the data bus. In the depicted example, where the address bus is twice as wide as the data bus, two read operations may be used to reflect the entire address bus onto the data bus. Alternatively, the second address bus segment is latched and output in a second phase of a single read operation. At step 504, microprocessor 104 checks the data bus values for the expected reflected pattern. If the pattern doesn't match, this indicates some type of fault and may be recorded at step 506 and reported to the user in any suitable manner. A step 508 tests whether each address bus pin has been tested. If each address bus has been tested, a step 510 completes the address bus check. If further iterations remain, processing continues at step 502.

Thus, it will be seen that bus integrity faults resulting from, e.g., shorted or open pins or traces, integrated circuit flaws, etc., are detected without the use of specialized external equipment. The test may be repeated at any time even after the unit has been placed in service.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

It should be noted that the flowchart steps of FIGS. 3-5 may be performed in any order. Furthermore, steps may be omitted, added, or substituted.

The invention claimed is:

1. An integrated circuit coupled to a data bus, said integrated circuit comprising:
   a diagnostic mode logic block;
   a non-diagnostic mode block; and
   a multiplexer system that selects signals from one of said diagnostic mode logic block and said non-diagnostic mode logic block to forward to said data bus;
   wherein upon entering a diagnostic mode, said multiplexer system couples said data bus to said diagnostic mode logic block and said diagnostic mode logic block responds to a sequence of read operations directed to said integrated circuit by outputting a sequence of predetermined patterns on said data bus, one of said predetermined patterns selected for output based on the number of previous read operations directed to said integrated circuit, said diagnostic mode comprising an address capture mode wherein read operations result in reflecting a sequence of test patterns on an address bus connected to said integrated circuit onto said data bus.

2. The integrated circuit of claim 1 wherein said sequence of predetermined patterns comprises walking a "1" bit across pins of said data bus.

3. The integrated circuit of claim 1 wherein a reset engages said diagnostic mode.

4. An integrated circuit coupled to a data bus, said integrated circuit comprising:
   a diagnostic mode logic block;
   a non-diagnostic mode block; and
   a multiplexer system that selects signals from one of said diagnostic mode logic block and said non-diagnostic mode logic block to forward to said data bus;
   wherein upon entering a diagnostic mode, said multiplexer system couples said data bus to said diagnostic mode logic block and said diagnostic mode logic block responds to a sequence of read operations directed to said integrated circuit by outputting a sequence of predetermined patterns on said data bus, said diagnostic mode comprising an address capture mode wherein read operations result in reflecting a sequence of test patterns on an address bus connected to said integrated circuit onto said data bus, wherein in each of said sequence of test patterns only one address bit is asserted with the asserted bit being shifted across the address bus for successive patterns.

5. The integrated circuit of claim 4 wherein a reset engages said diagnostic mode.

6. An integrated circuit coupled to a data bus, said integrated circuit comprising:
   a diagnostic mode logic block;
   a non-diagnostic mode block; and
   a multiplexer system that selects signals from one of said diagnostic mode logic block and said non-diagnostic mode logic block to forward to said data bus;
   wherein upon entering a diagnostic mode, said multiplexer system couples said data bus to said diagnostic mode logic block and said diagnostic mode logic block responds to a sequence of read operations directed to said integrated circuit by outputting a sequence of predetermined patterns on said data bus, said diagnostic mode comprising an address capture mode wherein read operations result in reflecting a sequence of test patterns on an address bus connected to said integrated circuit onto said data bus, wherein pins of the address bus are wider than pins of the data bus and multiple read operations are performed to reflect said sequence of test patterns.

7. The integrated circuit of claim 6 wherein said sequence of predetermined patterns comprises walking a "1" bit across pins of said data bus.

8. An integrated circuit coupled to a data bus, said integrated circuit comprising:
   a diagnostic mode logic block;
   a non-diagnostic mode block; and
   a multiplexer system that selects signals from one of said diagnostic mode logic block and said non-diagnostic mode logic block to forward to said data bus;
   wherein upon entering a diagnostic mode, said multiplexer system couples said data bus to said diagnostic mode logic block and said diagnostic mode logic block responds to a sequence of read operations directed to said integrated circuit by outputting a sequence of predetermined patterns on said data bus, said diagnostic mode comprising an address capture mode wherein read operations result in reflecting a sequence of test patterns on an address bus connected to said integrated circuit onto said data bus, wherein pins of the address bus are wider than pins of the data bus and a second address bus segment is latched and output in a second half of a single read operation.

9. The integrated circuit of claim 8 wherein a reset engages said diagnostic mode.

10. A method for testing an integrated circuit coupled to a data bus, the integrated circuit comprising a diagnostic mode logic block and a non-diagnostic mode block, the method comprising:
    selecting signals from one of said diagnostic mode logic block and said non-diagnostic mode logic block to forward to said data bus;
    upon entering a diagnostic mode, coupling said data bus to said diagnostic mode logic block and responding to a sequence of read operations directed to said integrated circuit by outputting a sequence of predetermined patterns on the data bus; and
    responding to a second sequence of read operations directed to said integrated circuit by reflecting a sequence of test patterns on an address bus connected to said integrated circuit onto said data bus, while in said diagnostic mode, wherein pins of the address bus are wider than pins of the data bus and reflecting the sequence of patterns comprises performing multiple read operations.

11. The method of claim 10 further comprising walking a "1" bit across pins of said data bus.

12. The method of claim 10 further comprising resetting the integrated circuit to engage said diagnostic mode.

13. The method of claim 10 further comprising selecting one of said predetermined patterns for output based on the number of previous read operations directed to said integrated circuit.

14. The method of claim 10 wherein in each of said sequence of test patterns only one address bit is asserted with the asserted bit being shifted across the address bus for successive patterns.

15. A system for testing an integrated circuit coupled to a data bus, the integrated circuit comprising a diagnostic mode logic block and a non-diagnostic mode block, the system comprising:

means for selecting signals from one of said diagnostic mode logic block and said non-diagnostic mode logic block to forward to said data bus;

means for upon entering a diagnostic mode, coupling said data bus to said diagnostic mode logic block and responding to a sequence of read operations directed to said integrated circuit by outputting a sequence of predetermined patterns on the data bus; and means for responding to a second sequence of read operations directed to said integrated circuit by reflecting a sequence of test patterns on an address bus connected to said integrated circuit onto said data bus, while in said diagnostic mode, wherein in each of said sequence of test patterns only one address bit is asserted with the asserted bit being shifted across the address bus for successive patterns.

16. The system of claim 15 further comprising means for walking a "1" bit across pins of said data bus.

17. The system of claim 15 further comprising means for resetting the integrated circuit to engage said diagnostic mode.

18. The system of claim 15 wherein pins of the address bus are wider than pins of the data bus and wherein means for reflecting the sequence of patterns comprises means for performing multiple read operations.

19. A system for testing an integrated circuit coupled to a data bus, the integrated circuit comprising a diagnostic mode logic block and a non-diagnostic mode block, the system comprising:

means for selecting signals from one of said diagnostic mode logic block and said non-diagnostic mode logic block to forward to said data bus;

means for upon entering a diagnostic mode, coupling said data bus to said diagnostic mode logic block and responding to a sequence of read operations directed to said integrated circuit by outputting a sequence of predetermined patterns on the data bus;

means for responding to a second sequence of read operations directed to said integrated circuit by reflecting a sequence of test patterns on an address bus connected to said integrated circuit onto said data bus, while in said diagnostic mode; and means for selecting one of said predetermined patterns for output based on the number of previous read operations directed to said integrated circuit.

20. The system of claim 19 wherein a reset engages said diagnostic mode.

* * * * *